United States Patent [19]
Schepel

[11] 4,385,672
[45] May 31, 1983

[54] FEED LEVEL INDICATOR

[76] Inventor: Donald D. Schepel, 2503 Lakepoint La., Clearwater, Fla. 33520

[21] Appl. No.: 353,904

[22] Filed: Mar. 2, 1982

[51] Int. Cl.³ .................... G01G 5/02; G01F 23/20
[52] U.S. Cl. .................................... 177/207; 73/296
[58] Field of Search ............ 177/207; 73/290 R, 296; 116/278

[56] References Cited

U.S. PATENT DOCUMENTS

| | | | |
|---|---|---|---|
| 1,880,436 | 10/1932 | Haskins | 177/207 X |
| 3,933,041 | 1/1976 | Hyer | 73/290 R |
| 3,994,169 | 11/1976 | Wolford | 73/290 R |
| 4,043,199 | 8/1977 | Greer | 177/225 X |

*Primary Examiner*—George H. Miller, Jr.
*Attorney, Agent, or Firm*—Ronald E. Smith

[57] ABSTRACT

An assembly that enables an observer stationed outside an opaque upstanding bin that contains fungible goods such as grain, feed, and the like, to determine the volumetric contents of such bin, by weight.

The assembly includes a frame assembly that is lowered within the bin by the observer stationed outside the bin until a plurality of circumferentially spaced shoe members-carried by such frame-contact the stored goods. The contact is sensed by the observer through a pulley-mounted cable member that carries the frame assembly at one of its ends, the other of its ends being manipulated by the observer to accomplish the lowering of such frame.

A preselected outer surface of the bin is marked with vertically spaced graduations that indirectly indicate the volumetric contents of the bin, by weight, when an indicator member carried by the cable enters into visually perceived alignment with an individual one of said graduations.

10 Claims, 6 Drawing Figures

FIG_1
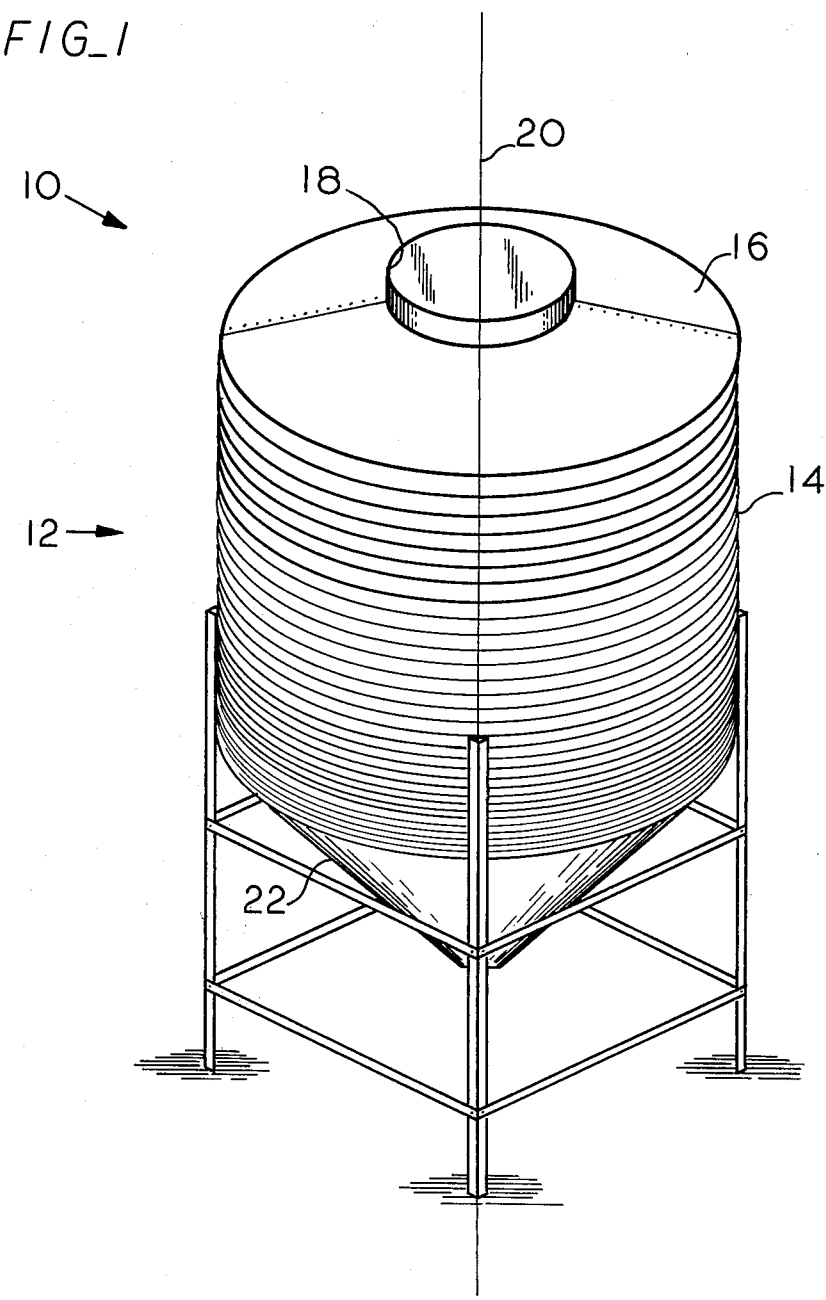

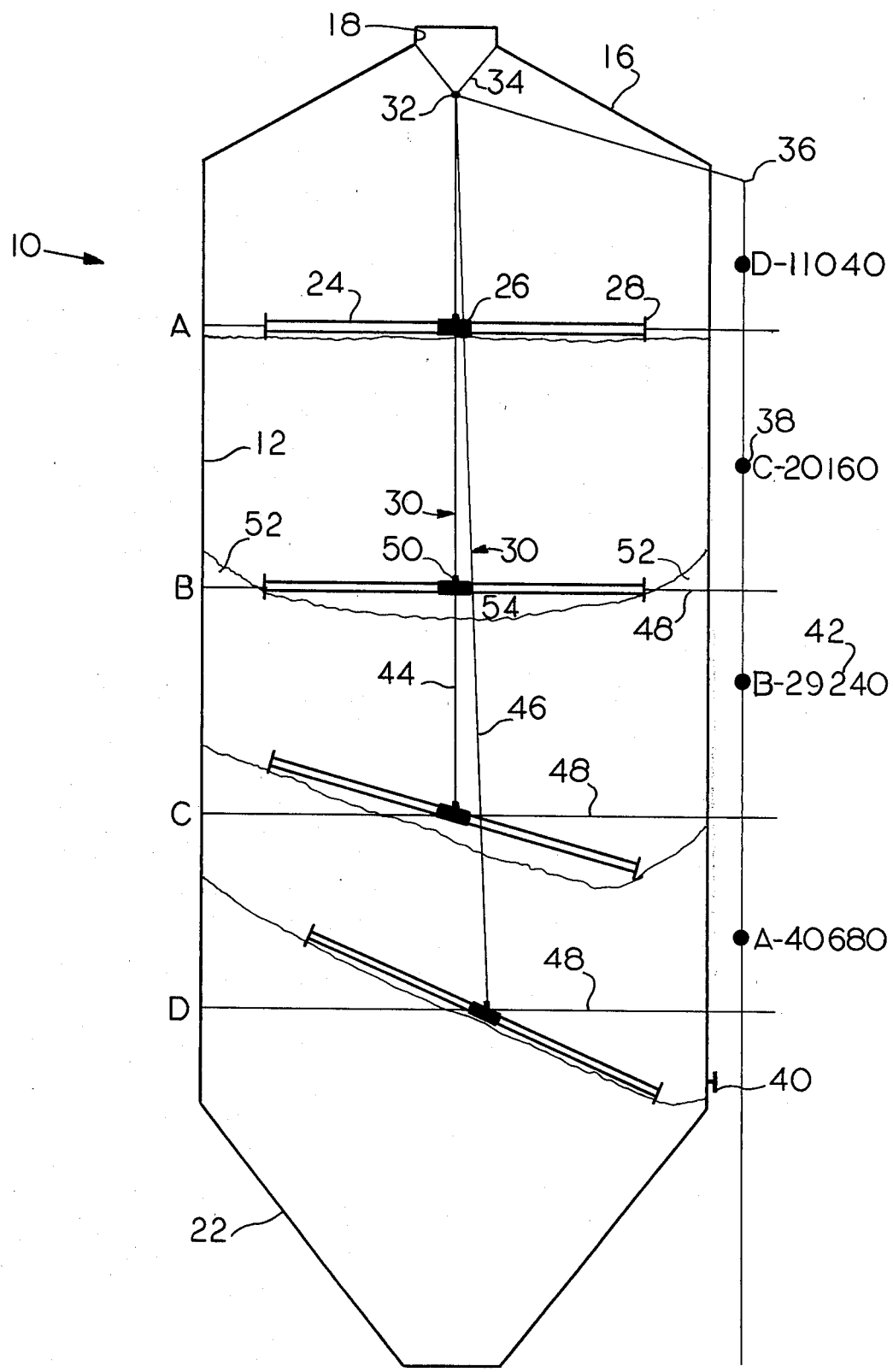
FIG_2

FIG_3
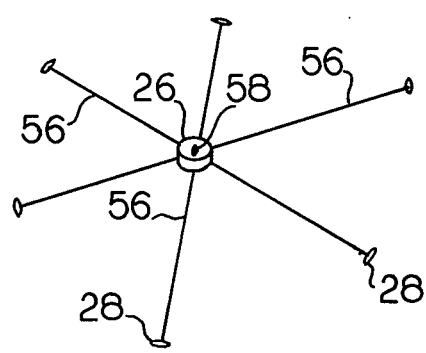
FIG_4
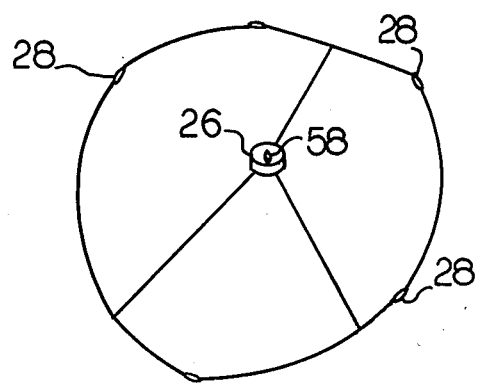
FIG_5
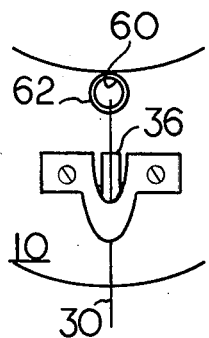
FIG_6
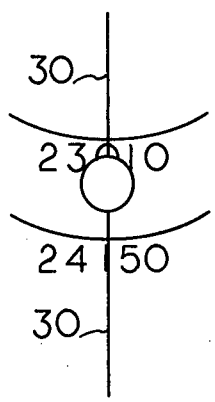

FEED LEVEL INDICATOR

BACKGROUND OF THE INVENTION

1. Field of the Invention

This invention relates, generally, to an assembly that indicates the weight of fungible goods stored within an opague bin, and more specifically relates to an assembly that measures such weight to a high degree of accuracy in that the assembly includes physical means that, in effect, provides a mathematical determination of the weight of the goods.

2. Description of the Prior Art

A search of U.S. patents that was conducted prior to the submission of this disclosure indicated that the following patents have been issued in the general field of this invention:

| Patentee | U.S. Pat. No. | Date of Issue |
|---|---|---|
| Corwin | 2,329,437 | 09-14-43 |
| Zimmerman | 3,685,356 | 08-22-72 |
| Liet, et.al. | 4,057,295 | 11-08-77 |
| McGown, et.al. | 4,248,088 | 02-03-81 |

The field of search covered Class/Subclass 33/1B, 52/245, 73/290, 322.5, 426, 427, 116/200, 226, 228, 280, 306, 307, 321.

Corwin shows a small household container having transparent walls provided with graduations. However, it is impractical to construct feed bins and the like with transparent materials.

Zimmerman's device requires that the contents of the container be conveniently positioned in a conical pile at all times. Since feed or grain stored in upstanding bins normally arranges its uppermost profile in a variety of differing configurations, the Zimmerman device does not solve the inventory problems encountered in connection with such bins.

Liet's assembly accomplishes the charging and discharging of fungible goods into and out of bins, respectively, but includes no means for determining the contents of the bin, by weight, at any given time.

McGown's apparatus has relevance only in the context of determining liquid levels within a container, and thus has little relevance in the context of the field of this invention.

Feed and grain suppliers typically own livestock and pay individual farm owners to feed and house the animals. Accordingly, the owners of the livestock make a strong effort to monitor the consumption of feed and grain at each location where their animals are fed and otherwise cared for. Thus, it is important that the feed and grain suppliers be provided with accurate inventories of the contents of the bins where the feed or grain is stored.

Most bin owners inventory their bins by climbing a ladder mounted to the bin and locking inside. After a rain, or during the winter, the steps of the ladder may be dangerously slippery. Another, less direct method for determining the level of goods within the bin involves the tossing of pebbles against the side of the bin until the level of goods is ascertained by locating the apparent level thereof. This acoustical method, like the visual inspection method, often results in inaccurate inventories. Feed and grain suppliers are thus unable to optimally schedule deliveries of such goods to the bins. Moreover, the suppliers are somewhat unable to monitor feed and grain consumption to any meaningful degree of accuracy.

In view of the present state of the art, there is a need for an assembly that conveniently and accurately reports the contents, by weight, of an opague bin to an observer stationed outside said bin.

The needed assembly should have a simple construction so that it would be economical to manufacture and thus affordable to bin owners. The assembly should be easy to operate, and should not require extensive modifications to existing bins. Moreover, and perhaps most importantly, the needed assembly should be able to measure the contents of the bin within a high degree of accuracy.

SUMMARY OF THE INVENTION

The longstanding but heretofore unfulfilled need for a device that indicates the contents, by weight, of a storage bin is now fulfilled in the form of an assembly that is operated by an observer stationed outside the bin. The observer plays out a length of cable to lower an assembly within the bin until such assembly rests atop the goods stored therein. An indicator means is carried by a portion of the cable that is exterior to the bin, which indicator rises vertically as the assembly that contacts the goods is lowered. An outer wall of the bin is marked with graduations that indirectly indicate the weight of goods in the bin, and the observer reads the graduation adjacent the indicator means when such observer senses by feel, the contacting of the goods by the frame assembly.

It is therefore seen that the primary object of this invention is to provide means for accurately measuring the weight of fungible goods stored within an opague bin.

Another object is to accomplish the foregoing object by providing a physical means that rests atop the fungible goods within the bin and which is specifically configured so that the measurement provided by such physical means closely approximates a mathematical determination of such weight.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a bin provided with the novel measuring assembly.

FIG. 2 is a longitudinal sectional view, in composite form, taken along line 2—2 of FIG. 1, showing the novel assembly deployed in the context of differing levels of fungible goods stored in such bin.

FIG. 3 is a perspective view of the preferred embodiment of the novel frame assembly and the shoes carried thereby.

FIG. 4 is a perspective view of an alternative embodiment of the novel frame assembly.

FIG. 5 is a detailed perspective view of the aperture means formed in the bin to accommodate the cable means that raises and lowers the frame assembly.

FIG. 6 is a detailed perspective view of the indicator means carried by the cable means, showing the juxtaposition of the indicator means with one of the graduated markings on the bin so that the weight of the goods within the bin can be determined.

DETAILED DESCRIPTION OF THE PREFERRED EMBODIMENT

Referring now to FIG. 1, there it will be seen that a conventional upstanding bin provided with the novel assembly is designated 10 as a whole. The bin 10 has cylindrical sidewalls 12 that are corrugated as shown and as indicated by the reference numeral 14.

The bin 10 has a sloped roof 16 to effect precipitation run off. Grain, feed, or other fungible goods are charged into the bin through opening 18, which opening 18 is concentric with the longitudinal axis of symmetry 20 of the bin 10. The lower portion of the bin has inwardly sloped walls 22. The fungible goods are removed from the lower portion of the bin by an auger means, not shown.

FIG. 2 shows, for purposes of illustration, four (4) different levels of goods stored within the bin. Level A represents a substantially full bin, and levels B, C and D represent successively lower levels. As is apparent from FIG. 2, the uppermost surface of the goods defines a relatively flat profile when the goods are at or near level A. The profile becomes a symmetrical concavity when the goods are at or near level B, and the profile becomes an asymmetrical concavity when the goods are at or near level C. Finally, when the bin 10 is nearly empty, the profile defines a sloping surface as shown.

The rightward shift of the grain that is depicted in FIG. 2 for levels C and D is caused by an auger-not shown-that removes the goods from the bin and which would be to the right of the bin as depicted in FIG. 2.

FIG. 2 also shows a major portion of the novel assembly as it would appear at each of the illustrative levels of feed or grain. The assembly includes a frame assembly, generally indicated as 24, hub 26, shoes 28 attached to the frame 24 for at least partially digging into the goods for traction purposes, a continuous cable means 30, a first pulley member 32, an assembly 34 for suspendedly mounting the first pulley member 30, and a second pulley member not shown in FIG. 2 but disposed as indicated by reference numeral 36.

Also shown in FIG. 2 is the indicator member 38 carried by cable 30, shown, as aforementioned, in four (4) illustrative positions. The letters A, B, C and D indicate the respective positions of the indicator 38 when the frame assembly 24 is resting atop the goods as indicated by the corresponding letters. The free end of the cable 30 is secured to a cleat 40 when the assembly is not in use, to secure such free end against flapping in the wind.

To use the invention, the observer releases the free end of the cable 30 from the cleat 40, and plays out the cable 30 until he or she feels the frame assembly 24 contact the uppermost profile of the goods. As the cable 30 is played out, the cable 30 will travel sequentially over the second pulley 36 and over the first pulley 32. The weight of the frame assembly 24 will of course cause the frame assembly to travel downwardly responsive to playing out of cable 30. The bin 10 is marked with graduations as indicated diagrammatically in FIG. 2 by the reference numeral 42. Accordingly, when the observer senses the contacting of the goods by the frame 24, he or she then reads the weight, in pounds, of the goods within the bin by reading the graduation mark 42 in juxtaposition with the indicator 38. Of course, the graduated marks 42 are positioned in accordance with predetermined levels of grain or feed.

Clearly, the indicator 38 rises as the frame 24 is lowered, and vice versa. Thus, the graduated marks 42 are aligned in ascending order from the top to the bottom of the bin 10, as depicted in FIG. 2.

It is very important to note that the frame assembly 24 shifts to the right, in FIG. 2, responsive to lowering of the level of the goods, as aforesaid. This causes the cable 30 to shift from a vertically disposed position indicated as 44 to an oblique position indicated as 46. As the level of goods drops, the angle between the cable and the axis of symmetry 20 will increase. The shoes 28 will prevent the frame 24 from sliding to the walls 12 of the bin.

An imaginery line 48 drawn orthogonal to the point 50 where the cable 30 is attached to the hub 26 best illustrates how the assembly provides a mathematical approximation of the weight of the fungible goods. At level B, an annular in configuration quantity of goods 52 will lie above the imaginery line 50, and a concavity 54 will lie therebelow. If the concave profile of the goods at level B is considered as a plot, in the cartesian coordinate system, of a mathematical function, the three (3) dimensional volume of areas 52 and 54, above and below the line 48, respectively, can be calculated with the calculus. As is visually ascertainable from an inspection of FIG. 2, the frame assembly effectively positions the imaginery line 48 so that it divides the areas 52 and 54, above and below the line 48, respectively, into substantially equal portions. Thus, a substantially accurate reading of the weight of the goods is provided.

Referring now to FIG. 3, it will be seen that the frame assembly 24 includes a plurality of radially disposed, equidistantly spaced, arm members 56. The arms 56 are fixedly secured to the hub 26, and the disc-shaped shoes 28 are affixed to the free ends of such arms 56. The cable 30 is attached to the hub 26 at eyehook 58.

FIG. 4 shows an alternative frame assembly of annular configuration as shown. This assembly would work best in the context of a very full bin 10 wherein the goods would form a convex profile, not shown.

FIG. 5 shows the second pulley 36, the opening 60 through which cable 30 extends, and a grommet 62 that frames the opening 60.

FIG. 6 shows the indicator means 38 that is carried by the cable 30 disposed in juxtaposition with a graduated mark 42.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. An assembly that determines the weight of fungible goods disposed interiorly of an opague container, comprising, a plurality of shoe means, a frame means for maintaining said shoe means in circumferentially spaced relation to one another, an elevating means for raising and lowering said frame means and hence said shoe means out of and into contacting relation, respectively, with said fungible goods, said elevating means having a portion thereof disposed exteriorly of said container, in visible relation to an observer stationed adjacent said container, a vertically disposed graduation means disposed on a preselected exterior surface of said container, an indicator means fixedly secured to and movable conjointly with said exterior portion of said elevating means, said indicator means and said graduation means cooperatively positioned so that said observer may make an analog-type reading of the contents, by weight, of said goods when said shoe means are collectively resting atop said goods.

2. The assembly of claim 1, wherein said frame means comprises a plurality of radially disposed arm members, said shoe means being fixedly secured to the distal ends of different ones of said arm members, and said arm members having their respective proximal ends fixedly secured to a hub member disposed at the center of said frame means.

3. The assembly of claim 1, wherein said frame means comprises an annular member, and wherein said shoe means are mounted along the perimeter of said annular member in substantially equidistantly spaced relation to one another.

4. The assembly of claims 2 or 3, wherein said container means has an open top, and wherein a cable support means is suspendedly mounted downwardly of the opening defined by said open top.

5. The assembly of claim 4, wherein said cable support means comprises a rotatably mounted, stationary first pulley means, and wherein said cable means is introduced into or withdrawn from the interior of said container attendant travel of said cable means relative to said first pulley means.

6. The assembly of claim 5, wherein an aperture means is formed in said container to thereby form a passage means for said cable means into and out of the interior portion of said container.

7. The assembly of claim 6, wherein a second stationary pulley member is rotatably mounted exteriorly of said bin in general horizontal alignment with said first pulley means so that said cable means defines a path of travel including a substantially vertical portion exteriorly of said bin, a generally horizontal portion between said first and second pulley means, and a substantially vertical portion interiorly of said bin extending from said first pulley means and said hub means.

8. The assembly of claim 7, wherein said bin has a longitudinal axis of symmetry, and wherein said first pulley means is aligned with said axis of symmetry.

9. The assembly of claim 8, wherein a cleat means is fixedly secured to said bin at a portion thereof near ground level so that an observer may tie the free end of said cable means to said cleat when said assembly is not in use, said assembly being raised to its highest level when not in use.

10. The assembly of claim 9, wherein said cable means describes a path of travel including a first vertical portion extending from said cleat means to said second pulley means, a generally horizontal portion to said second pulley means, and a substantially vertical portion to said hub means, when said assembly is not in use, the free end of said cable means being released from said cleat means when said assembly is in use.

* * * * *